United States Patent [19]

Prior et al.

[11] Patent Number: 5,778,996
[45] Date of Patent: Jul. 14, 1998

[54] COMBINATION POWER WHEELCHAIR AND WALKER

[76] Inventors: Ronald E. Prior; Susan R. Harris. both of 4915 Industrial Way, Coeur d'Alene, Id. 83814

[21] Appl. No.: 551,704

[22] Filed: Nov. 1, 1995

[51] Int. Cl.$^6$ ............................................. B60K 1/02
[52] U.S. Cl. ............................ 180/65.1; 180/907
[58] Field of Search ........................... 180/65.1, 65.5, 180/65.6, 65.7, 907; 297/5, 6, DIG. 4

[56] References Cited

U.S. PATENT DOCUMENTS

| | | | |
|---|---|---|---|
| 3,708,182 | 1/1973 | Markiel | 280/289 |
| 4,506,900 | 3/1985 | Kordsue | 280/242 |
| 5,058,912 | 10/1991 | Harroun | 280/87.021 |
| 5,163,188 | 11/1992 | Munroe | 5/81.1 |
| 5,224,731 | 7/1993 | Johnson | 280/648 |
| 5,265,689 | 11/1993 | Kaufmann | 180/907 |
| 5,366,036 | 11/1994 | Perry | 180/907 |
| 5,409,074 | 4/1995 | Wilson et al. | 180/907 |
| 5,556,121 | 9/1996 | Pillot | 180/907 |
| 5,592,997 | 1/1997 | Ball | 180/907 |

*Primary Examiner*—Richard M. Camby
*Attorney, Agent, or Firm*—David S. Thompson

[57] ABSTRACT

A combination power wheelchair and power walker provides dual controls that may be used by either a seated user or a user walking behind and partially supported by the mobility aid. A hand control assembly provides a seated user with an on-off switch and forward-off-reverse switches for each motor. A direction controller assembly connects and provides coordinated movement of the left and right switch handles of the hand control assembly. The direction controller assembly allows the user to operate both switches with one hand by means of pushing, pulling or twisting motions, and replaces an expensive joy-stick assembly. A walker control assembly which overrides the hand control assembly, allows a walking user to operate both motors in either a forward or reverse direction, and to easily control walker speed and direction with gentle pushes or pulls on the walker handles. The left and right motors drive rear wheels through a shock absorbing flex coupling that tends to absorb the initial jolt when either motor is turned on.

18 Claims, 7 Drawing Sheets

COMBINATION POWER WHEELCHAIR AND WALKER

CROSS-REFERENCES

There are no applications related to this application filed in this or any foreign country.

BACKGROUND

It is well known and understood that several categories of physically handicapped individuals, particularly including the elderly, may need progressively more complex mobility aids. Often, the cost of the mobility aids becomes increasingly expensive, leaving the user in a situation where the mobility aid that would serve best is financially unobtainable.

Traditionally, users of mobility aids may start with ambulatory aids such as a cane or a walker, and then progress to a manual wheelchair. Some may purchase a 3- or 4-wheel power scooter, and a few may purchase a power wheelchair. Users often end up with several mobility aids which they use to accomplish different tasks. For example, indoors they may use the walker or cane, while outdoors they may use a power scooter or a manual or power wheelchair. In confined areas such as a small restroom, the walker or cane may perform best, since the scooter or wheelchair may be too big to enter the area.

Walkers are typically 4-legged supports made of light weight tubing, and are used for balance and support as one walks. Walkers are typically pushed in front of a walking user, and often fold for compact storage. Some walkers come with wheels (sometimes referred to as rollators) to reduce the energy expenditure of the user. Wheeled walkers often have bicycle-like hand brake levers to prevent the wheels from rolling or if the user feels a sudden need for additional stability. The ability of a user to carry anything while using a walker is usually very limited.

The use of manual wheelchairs by the elderly is somewhat restrictive. Most elderly do not have sufficient arm strength to effectively self propel themselves. Some elderly sit and propel themselves backwards with their feet. For longer distances, assistance by an attendant is often effective, but at the sacrifice of independence. For shorter distances, a walker is often more effective than using a manual wheelchair.

Power wheelchairs and scooters are most often designed for both indoor and outdoor use. Consequently, they are usually a compromise. They are too big, heavy and powerful for the best indoor maneuverability, and outdoors, they usually do not have enough off road capability, range and power to do everything that someone may desire. They tend to be expensive to purchase and expensive to maintain. Four wheel power wheelchairs tend to be used most often by young and middle aged adults with such disabilities as spinal cord injury, muscular dystrophy, multiple sclerosis, cerebral palsy or arthritis. Power scooters and carts tend to have a somewhat older user group, with arthritis and old age being common reasons for using the devices. Both power wheelchairs and scooters may be difficult for some users to control indoors and often intimidate the elderly.

The elderly as well as many terminal patients typically have good days and bad days. On a good day, they may want to walk a little; on a bad day, they cannot. Further, if they walk too far on any day, they may be unable to return to their starting point without great difficulty as well as increased risk of falling. As a result, a combination walker and wheelchair is a solution to this problem. Using a combination walker and wheelchair, a user can walk until tired, then use the combination device as a wheelchair to sit in to rest or to move a short distance. For many elderly as well as terminal patients, the walks they desire to make may be rather short; on the order of tens or hundreds of feet, not miles. Unfortunately, a manual wheelchair may still require too much energy for many users to self-propel themselves.

Accordingly, the combination powered wheelchair and powered walker of the instant invention makes the most sense. Users can walk further because it takes less effort to move the powered walker, and if they get tired, the users can sit down and drive the powered wheelchair. Most use of the device would be indoors, though a modest amount of outdoor use in good weather might be desirable for some users. Nursing homes as well as residences might be typical places in which the disclosed mobility aid would be used. A combination power wheelchair and walker also has the added bonus of the ability to transport objects, unlike most walkers.

What is needed and is herein disclosed is a mobility aid that: (1) can perform as a powered wheelchair or a powered walker; (2) has excellent indoor maneuverability; (3) is easy to use; (4) is low cost; (5) is light weight; (6) is portable; (7) has a rather slow speed; and (8) can be pushed from behind by an attendant or other care giver.

For the foregoing reasons, there is a need for a combination power wheelchair and power walker. The present invention therefore provides a novel and useful approach to solving the above-mentioned problems. The light-weight and low-cost power wheelchair of the invention, also having the functionality of a being a power assisted walker, allows a user to walk in an assisted manner until physically tired. At that point, the user would then sit down in the wheelchair portion of the apparatus and continue moving assisted by the motor-driven wheelchair. The light-weight construction of the invention is consistent with the needs of many people, who spend the majority of their time indoors, either at home or in nursing homes. As will be explained, several aspects of the invention are consistent with a lower cost of production, and cooperate to produce a combination power wheelchair and power walker that is of a new and novel structural design as well as of a durable, high quality construction.

SUMMARY

The present invention is directed to an apparatus that satisfies the above needs. A novel powered mobility aid is provided that is suitable for assisting a person in movement, either by carrying the person in a seated manner or by supporting the person as the person walks behind the device.

The powered mobility aid of the present invention provides:

(a) A frame. Generally the frame is consistent with the frame of a wheelchair. However, scooter and other small vehicle frames may also be consistent with the invention. The frame typically provides a seat and a back assembly that folds against the seat for storage or transportation. The frame of the mobility aid also includes a walker handle assembly that partially supports a walking user.

(b) At least one caster wheel pivotingly mounted to the frame. Typically a caster wheel assembly provides both left and right front mounted caster wheels.

(c) At least one non-pivoting wheel mounted to the frame. Typically non-pivoting left and right independently rotatable rear wheel assemblies are provided.

(d) An electrical power assembly, usually providing a heavy duty 12 volt battery and a suitable recharging unit.

(e) A drive line assembly for delivering mechanical power to at least one non-pivoting wheel. In the preferred version of the invention, left and right drive line assemblies provide left and right rear drive wheels, each coupled to an electric motor and gearbox assembly by means of left and right drive shafts and flex couplings. The flex couplings allow the drive shafts to be somewhat out of alignment and tend to absorb mechanical shock as a motor turns on.

(g) A hand control assembly, for typically one-handed use by a seated user. In the preferred embodiment, this assembly provides a power on-off switch and left and right motor control switches. The power on-off switch prevents the operation of the motor control switches, and shorts the electrical input and electrical output of each motor together, causing the motors to perform like a brake.

(h) A walker control assembly suitable for allowing someone walking behind the device to control the forward and reverse movement. Typically, the walker control assembly would provide both forward and reverse motor control switches.

(i) Switching circuitry, controlled by the walker control assembly, for preventing the operation of the hand control assembly when the walker control assembly is being operated, and for ensuring that the walker switches operate even if the wheelchair power on-off switch is turned off. The switching circuitry generally provides some type of switching components, typically relays, or other equivalent circuits. The switching circuitry also causes the motors to be in series with power resisters when the motors are activated by the walker control assembly. The resistors tend to smooth the response of the motors, slow their speed, and allow the user to easily overcome the movement of the device— all features beneficial for operation of a walker. By exerting just a few ounces of force on either or both handles of the walker, the user can set any desired speed and direction of movement.

The preferred version of the invention may also include:

(a) A direction controller assembly, connecting the left and right motor control switches of the hand control assembly. The directional controller generally provides a handle assembly having round and slot holes on its underside. By placing the holes over the switch handles of the left and right motor control switches of the hand control assembly, the user may coordinate the control of the left and right motors with one convenient hand movement. The handle typically includes front and rear tubes, each tube having round and slot holes, and is installable in any of three different angles, thereby accommodating different user capabilities as well as being installable on either the left or the right wheelchair arm and adjustable for use by either left- or right-handed users.

It is therefore a primary advantage of the present invention to provide a novel powered wheelchair and walker adapted for carrying a user and for supporting the user walking behind the chair.

Another advantage of the present invention is to provide electrical circuitry that prevents the operation of the hand control assembly of the wheelchair when the walker control assembly is in use. This gives an attendant control when a patient is seated in the wheelchair, but more importantly, when the user is in the walker position, the device is always ready for use.

A still further advantage of the present invention is to provide an inexpensive direction control assembly which replaces an expensive joystick assembly, yet still allows a user to control both the left and right switches of the hand control assembly of the wheelchair with a simple and intuitive hand or wrist movement.

An additional advantage of the present invention is to provide a drive wheel assembly that tends to lessen the shock associated with turning on a motor, and which smooths the acceleration of the power wheelchair, without resorting to the expense of structures to supply a variable voltage source to the drive motors. In walker mode, series resistors provide additional insurance that the turn-on is smooth and that the user can easily overcome the movement of the chair.

DRAWINGS

These and other features, aspects, and advantages of the present invention will become better understood with regard to the following description, appended claims, and accompanying drawings where:

DESCRIPTION

Figure 1:
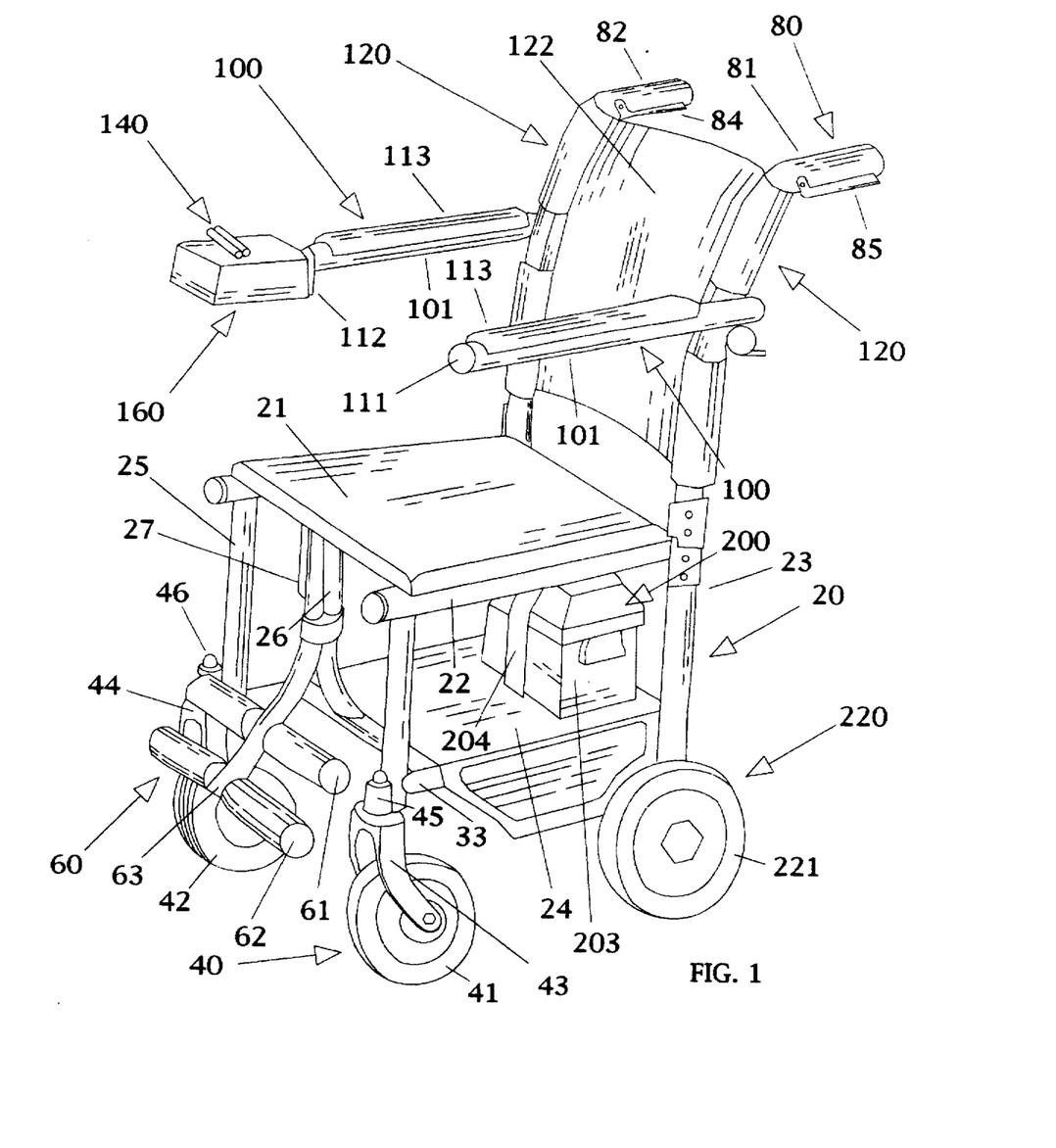
FIG. 1 is a perspective view of a version of the combination power wheelchair and walker of the invention.

Referring in particular to FIG. 1, a combination power wheelchair and walker constructed in accordance with the principles of the invention is seen. As shown, the preferred embodiment of the combination powered wheelchair and walker provides a frame 20, supported by a front caster wheel assembly 40 and by left and right rear drive wheel assemblies 221, 222. The combination power wheelchair and walker also provides a walker control and handle assembly 80 for the balance and partial physical support of a walking user as well as electrical control of the walker. A hand control assembly 160 allows a seated user to manually operate the wheelchair, typically in conjunction with a Wobulator™ direction controller 140, which makes directional control substantially easier, and substantially reduces costs by eliminating the need for a joy stick and variable speed motor control circuitry. Switching electronics resolves conflicting signals between the hand control assembly 160 and the walker controls 80 by locking out the hand control assembly when the walker controls are in use. An electrical power assembly 200 supplies electrical power to drive line assemblies 220, which in turn supply mechanical power to the drive wheels.

In embodiment of the invention seen in FIG. 1, the frame assembly 20 provides characteristics consistent with some of the structures found in both wheelchairs and in walkers. The frame 20, including upper 22 and lower 33 horizontal support tubes, and front 25 and rear 23 vertical support tubes, is typically made out of aluminum or steel tubing, or any other suitable material, as is well known by those in the art. A seat 21 supported by the frame 20 supports a seated user. A support shelf 24, located below the seat 21, supports the electrical power assembly 200 and also provides a small area for storage of personal items such as a purse or other similarly sized item.

The frame assembly 20 is supported in part by a caster wheel assembly 40. As seen in FIG. 1, in the preferred embodiment the caster wheel assembly 40 provides left and right front mounted pivoting caster wheels 41, 42, supported by left and right front wheel forks 43, 44 which are mounted on left and right caster barrel assemblies 45, 46. The caster barrels 45, 46 allow the wheels 41, 42 to rotate freely in the manner of a caster wheel, and typically provide a well-known ball-bearing type construction that reduces the friction as the wheels rotate.

In an alternative species, frame 20 is supported by a caster wheel assembly 40 providing a single caster wheel (not shown) mounted in the center of the front portion of the frame.

The drive line assembly 220 provides the mechanical power required to drive the combination powered wheel and walker. In the preferred embodiment, a left electric motor and gearbox 223 and a right electric motor and gearbox 224 drive left 221 and right 222 rear drive wheel assemblies, both of which are rear-mounted on the frame 20, as seen in FIG. 1. In the preferred version both motors are fractional horsepower, 12 volt direct current driven motors. Alternatively, a single motor may be adapted for use by known gear and transmission means. Electrical motors are preferred to gasoline engines, because the combined wheelchair and walker is intended primarily for indoor use at speeds of about 2 mph or less.

Figure 13:
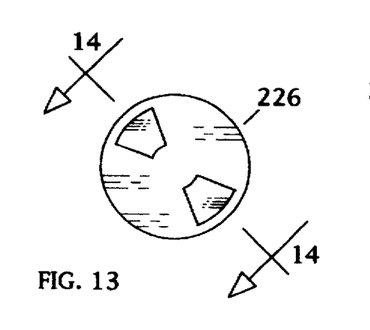
FIG. 13 is an end view of a coupling hub of the flex coupling of the drive wheel assembly.
Figure 14:
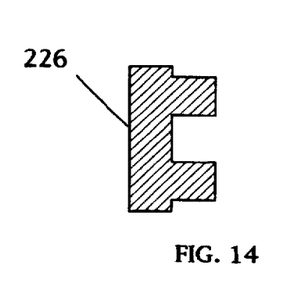
FIG. 14 is a cross-sectional view of the coupling hub of FIG. 13, along the 14—14 lines.
Figure 15:
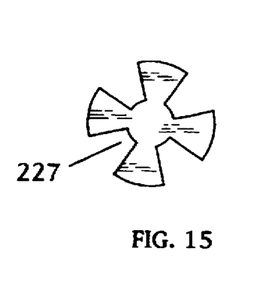
FIG. 15 is a top view of the insert of the flex coupling of the mechanical drive assembly.

In the preferred embodiment, left and right drive wheel assemblies 221, 222 are rear mounted on the frame 20. Referring to the detail of FIG. 17, the rear view of the drive right line assembly 220 and the right rear drive wheel assembly 221 can be seen. Right motor and gearbox assembly 224 is attached to inside rear wheel mounting bracket 243 by means of three motor standoffs 247. Electric cable 248 provides 12 volt direct current to the motor. Outside rear wheel mounting bracket 244 and inside mounting bracket 243 are connected to rear vertical support tube 23 by a pair of bolts 245 and nylon lock nuts 246. Motor and gearbox output shaft 225 is linked to a flex coupling having an similar inner 226 and outer 228 coupling hub, and an insert 227. The flex coupling can be one of a type made by G & G Mfg. Co. of Omaha, Nebr., and is seen in FIGS. 13-15. Two metallic coupling hubs, such as the hub 226 seen in the two views of FIGS. 13 and 14, are separated by a rubber insert 227, as seen in FIG. 15. The flex coupling tends to reduce problems associated with alignment error between the motor output shaft 225 and the rear axle 229, thereby relaxing tolerances and reducing fabrication cost. Perhaps more importantly, the rubber insert 227 of the flex coupling tends to absorb the shock as the motor initially turns on. The resiliently deformable insert portion 227 of the flex coupling absorbs enough energy as the motor initially turns on to noticeably smooth the torque applied to the drive wheels. The flex coupling in turn rotates a rear axle 229 which applies torque directly to the drive wheel. Since the speed is limited to about 2 mph, the flex coupling and switch controlled motors produce a ride that is far smoother than that typically associated with 3 mph switch controlled (non-proportional, i.e. non-variable voltage supplied) wheelchairs manufactured between 1950 and 1980. Further, the low-speed makes a 12 volt wheelchair feasible. The net affect is a great reduction in cost as follows: one battery instead of two, a smaller inexpensive automotive type charger, two toggle switches and a directional controller 140 instead of a joystick and associated proportional electronics, and inexpensive 12 volt motors with gearboxes instead of larger, 24 volt motors requiring two 12 volt batteries in series.

Figure 17:
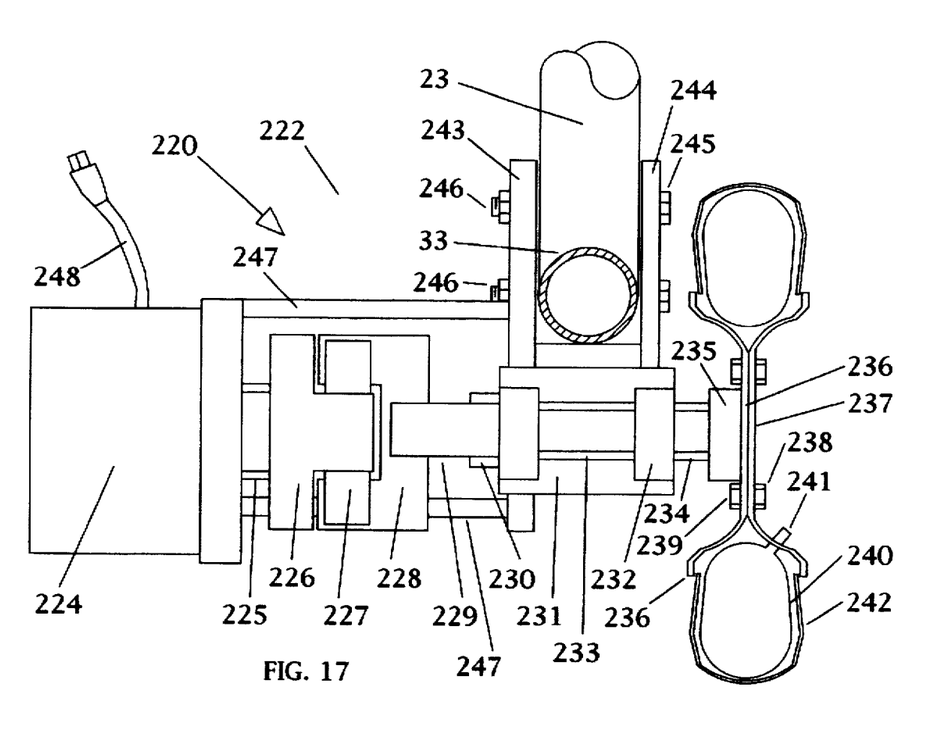
FIG. 17 partial cross-sectional view of the right drive line assembly and the right rear drive wheel assembly.

Outer shaft coupling 228 drives rear axle 229, which carries rear axle nylon lock nut 230. Rear wheel mount 231 carries rear wheel bearings 232 and bearings inner race spacer 233. A rear wheel spacer 234 and rear wheel hub 235 provides needed space between the wheel assembly 222 and frame 20. Inner wheel dish 236 and outer wheel dish 237 are held together by bolts 238 and lock nuts 239. A tire 242 provides an inner tube 240 and valve 241, and is carried between the inner dish 236 and outer dish 237.

In an alternative species (not shown), the left and right drive line and drive wheel assemblies are front mounted and one or more rear mounted caster wheels are provided.

In a further alternative species (not shown), a combined power walker having at least one drive wheel and an associated drive line and a manually propelled wheelchair is provided. Such a combined power walker and manual wheelchair could be propelled in wheelchair mode by means of handrims or by the user's feet. The electrical power requirements of such a power walker would be much lower than that of a power wheelchair because the user's weight does not have to be moved. As a result, the combined power walker and manual wheelchair could utilize a smaller motor and battery than a combined power walker and power wheelchair. To use the manual wheelchair, the drive line (powering the walker) must be disengaged from the drive wheel. A well known type of quick release mechanism, located between the drive line assembly and the drive wheel allows the user to easily engage or disengage a drive wheel. A common type of quick release mechanism provides a spring-loaded plunger having a rotating knurled knob that controls two sets of interlocking teeth. A simple rotation of the knob and a short movement of the drive wheels will engage or disengage the drive line assembly. Other types of wheel releases, such as mechanically lifting a drive wheel off the ground or releasing drive belt tension, are also possible.

A footrest assembly 60 is attached to the frame 20, and supports the feet and lower legs of a seated passenger. As seen in FIG. 1, the footrest assembly provides an ankle/calf support 61 and a foot support 62 carried by a main member 63. The footrest assembly 60 may be adjusted on support tube 27 by means of a footrest lock tube 26, to provide support for users having various leg lengths. Alternatively, main member 63 may be a telescoping tube having a fastener such as a bolt and nut for adjustment. While this type of footrest is depicted, any of the standard types of footrest and legrests well known to those trained in the art could be used.

A walker control and handle assembly 80 attaches to the frame 20 and provides a structure for aiding balance and for partial physical support of a walking user. In the preferred embodiment, separate left and right handles 81, 82 each having a foam handle grip 83 allow a walking user to grasp and be supported by the combination power wheelchair and walker. Alternatively, walker handle assembly 80 may provide a single bar (not shown) a spaced distance from and generally parallel to, the back upholstery 122.

Figure 16:
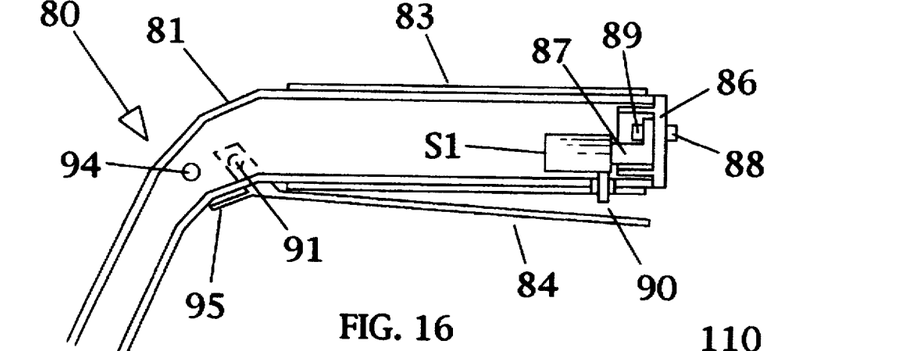
FIG. 16 is a side cross-sectional view of the walker control and handle assembly.

A walker control and handle assembly 80 allows a walking user to control the electrical power supplied to the drive line assembly 220, and to thereby control the direction and movement of the wheelchair. As seen in FIG. 16, a tube cap 86 is typically made of plastic and is press-fit into the end of handles 81, 82. Walker forward switch S2 and walker reverse switch S, are each mounted by means of a switch mounting bracket 87 attached to the tube cap 86. Two screws 88 and kep nuts 89 keep the switch mounting bracket 87 in place. Each switch provides a switch actuator 90 which protrudes from a hole in the handles 81, 82 of the walker handle assembly 80. Forward (right) 84 and reverse (left) 85 activation levers, attached to left and right handles 81, 82 move through a narrow range of motion about activation lever pivot 91. The switch activation levers 84, 85 are mounted on the lower side of handles 81, 82, which allows the user to lean against, and gain support from, handles 81, 82 without operating the actuator levers 90. Movement by the user of activation levers 84, 85 pushes switch actuator 90, thereby changing the state of the walker control switches S1, S2. An activation lever stop 95 prevents the levers 84, 85 from moving far from foam hand grip 83. A walker switch cable 92, seen in FIG. 12, enters the handle assembly 80 at hole 94, and attaches to the circuitry by means of a connector 93, also seen in FIG. 19.

Figures 10, 18:
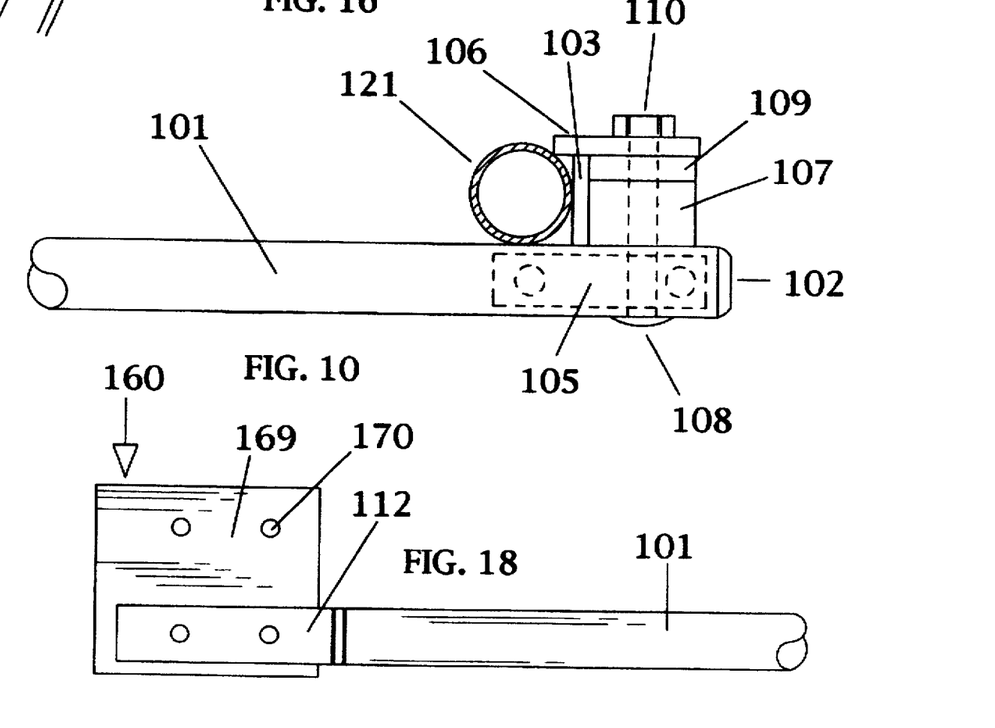
FIG. 10 is a top view of the pivoting arm assembly, with the arm in the down position.
FIG. 18 is a bottom view of the hand control assembly attached to an arm of the combination powered wheelchair and walker.
Figure 11:
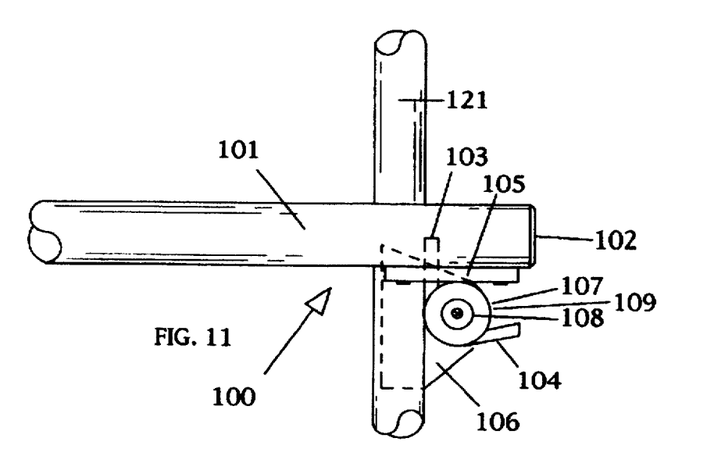
FIG. 11 is a side view of the pivoting arm assembly, with the arm in the down position.

The flip-up arm assemblies 100 allow the user to flip either arm up and out of the way when transferring in or out of the wheelchair seat 21. The pivoting arm assemblies 100 also allow closer approach to tables when sitting in the chair. As seen in FIG. 11, the pivoting arm assembly 100 provides an arm 101 having a rear tube cap 102 and an armrest pad 11 3. The arm 101 is can be pivoted approximately 110 degrees from horizontal. When flipped up, the user can more easily sit down and stand up. In the horizontal position, the wheelchair arm provides a seated user proper arm and hand support. FIG. 11 shows arm 101 in the horizontal position in which it is typically used. FIG. 10 is a view of arm 101 in its horizontal position as seen from the top. Backpost attachment plate 106 carried by vertical backpost tube 121 provides a hole (not shown) through which passes a bolt 108 carrying nylon friction disk 109 and nylon lock nut 110. The middle portion of bolt 108 is encased in arm pivot 107. Arm attachment plate 105 is attached to arm 101 near end portion 102, and is fastened to arm pivot 107 by welding or other means. An up-stop 104 is attached to arm pivot 107 and rests against backpost tube 121 in the up position. A down-stop 103 is attached to arm pivot 107 and rests against the backpost tube 121 in the down position. Nylon friction disk 109 allows bolt 108 and nylon lock nut 110 to be tightened to the degree required that the arm stays in the position the user places it in. While this type of arm is depicted, and used in the preferred embodiment, other types of standard wheelchair arms such as desk arms or full length detachable arms, adjustable detachable arms, and others, all well known to those trained in the art, may alternatively be used.

As seen in FIG. 1 8, a hand control mounting bracket 112 is used to attach the hand control assembly 160 to the arm 101. As seen in FIG. 1, a simple tube cap 111 is inserted into the end of the arm 101 not supporting a control assembly 160. The arms may be easily interchanged to provide either left or right hand control.

Figures 12, 12A:
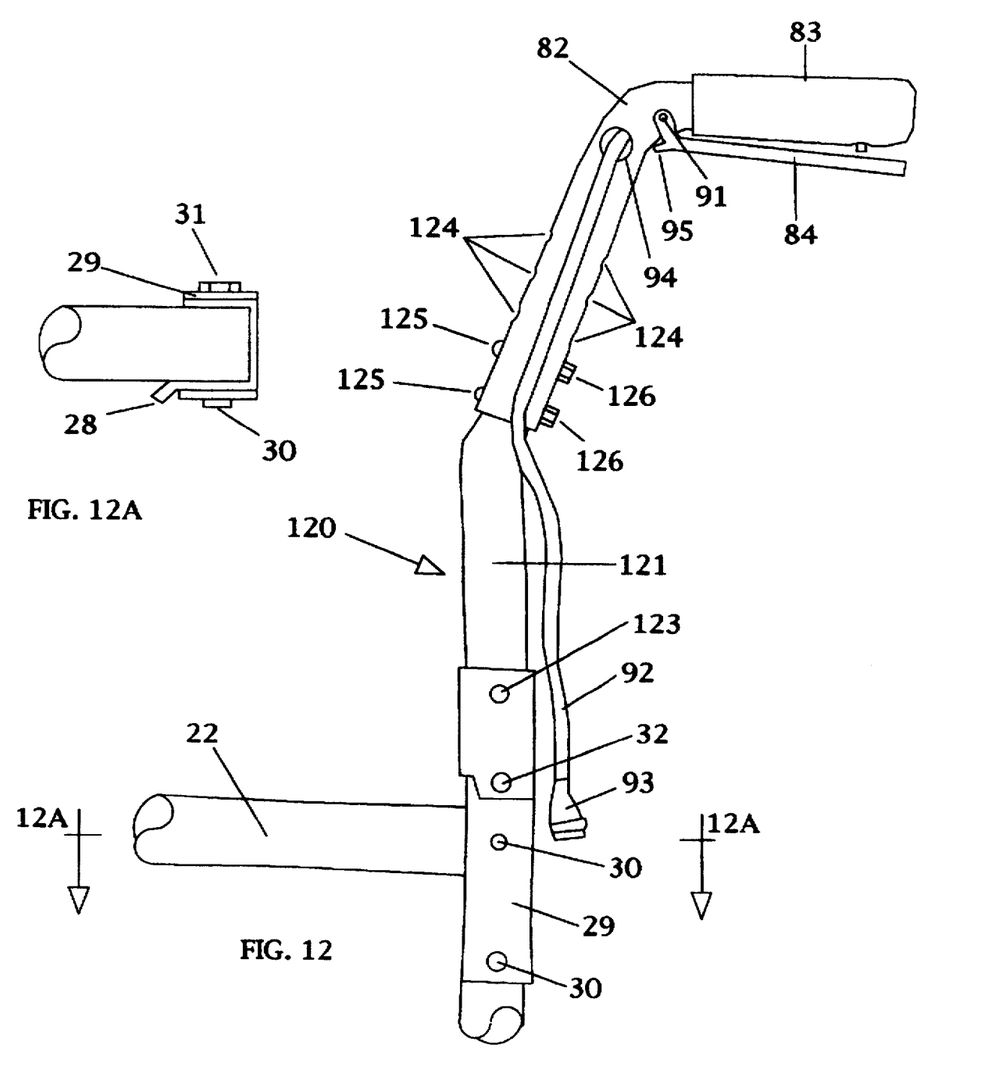
FIG. 12 is a side view of the right backpost assembly.
FIG. 12A is a cross-sectional view of the backpost assembly of FIG. 12, along the 12A—12A lines.

The backpost assemblies 120 and the back upholstery 122 allow a seated user to lean back in a supported manner. Referring to FIGS. 1 and 12, a pair of vertical backpost tubes 121 support back upholstery 122. The backpost assemblies 120 may be pivoted forward, so that the back upholstery 122 rests against the seat 21, for storage or transport. Backpost mount 29 and backpost lock plate 28, secured by retaining bolts 30 and nylon lock nuts 31 allow a backpost pivot bolt 32 to be installed through backpost tube 121. A locking pin 123 is biased in a manner that locks the backrest assembly 120 in place. Manual pressure will release pin 123. Once locking pin 123 is released, the backrest assembly rotates on pivot bolt 32. When backrest assembly 120 is again raised to the vertical position, locking pin 123 snaps back into place, preventing further rotation of the backpost.

As seen in FIG. 12, the backpost assembly 120 provides a means for vertical adjustment of the walker handle assembly 80, so that the walker is usable by people of various heights. A plurality of walker handle height adjustment holes 124 provide a variety of adjustment positions. Two walker handle mounting bolts 125 are used to secure the sliding left and right walker handles 81, 82 to the backpost tube 121. Two nylon lock nuts 126 secure bolts 125 in place.

A hand control assembly 160 allows a seated user to control the power supplied to the drive line assemblies 220, and to thereby control the movement and direction of the wheelchair. The hand control assembly 160 is mounted on the end of either the left or right arm 100, as seen in FIG. 1. The hand control assembly 160 provides a box-like enclosure 161. The left and right motor double pole, double throw (DPDT) momentary center-off control switches S3, S4 and the DPDT power on-off switch S5 are mounted inside the enclosure 161. The upper surface 165 of the enclosure provides openings for the switch handles 167 of the left and right motor switches S3, S4, while the rear surface 168 provides an opening for the power on-off switch S5. A bottom plate 169, seen in FIG. 18, provides four threaded bolt holes 170, which allows plate 169 to be attached by means of two bolts in either of two positions, either to the left or to the right of the arm, depending upon user preference.

Wobulator™ directional controller 140 includes a handle assembly 141 that mechanically links the switch handles 167 of the left motor DPDT control switch S3 and the right motor DPDT control switch S4. When the user is seated in the wheelchair, the direction of movement of the combination power wheelchair and walker is controlled by the operation of switches S3, S4. Unfortunately, simultaneously coordinating the operation of these two switches requires more dexterity than many users possess. However, an elongate, two-ended handle 141 provided by direction controller 140 is easier to grasp and more intuitive to control than switches S3, S4 alone.

Figures 2, 3, 4, 5, 6, 7, 8, 9:
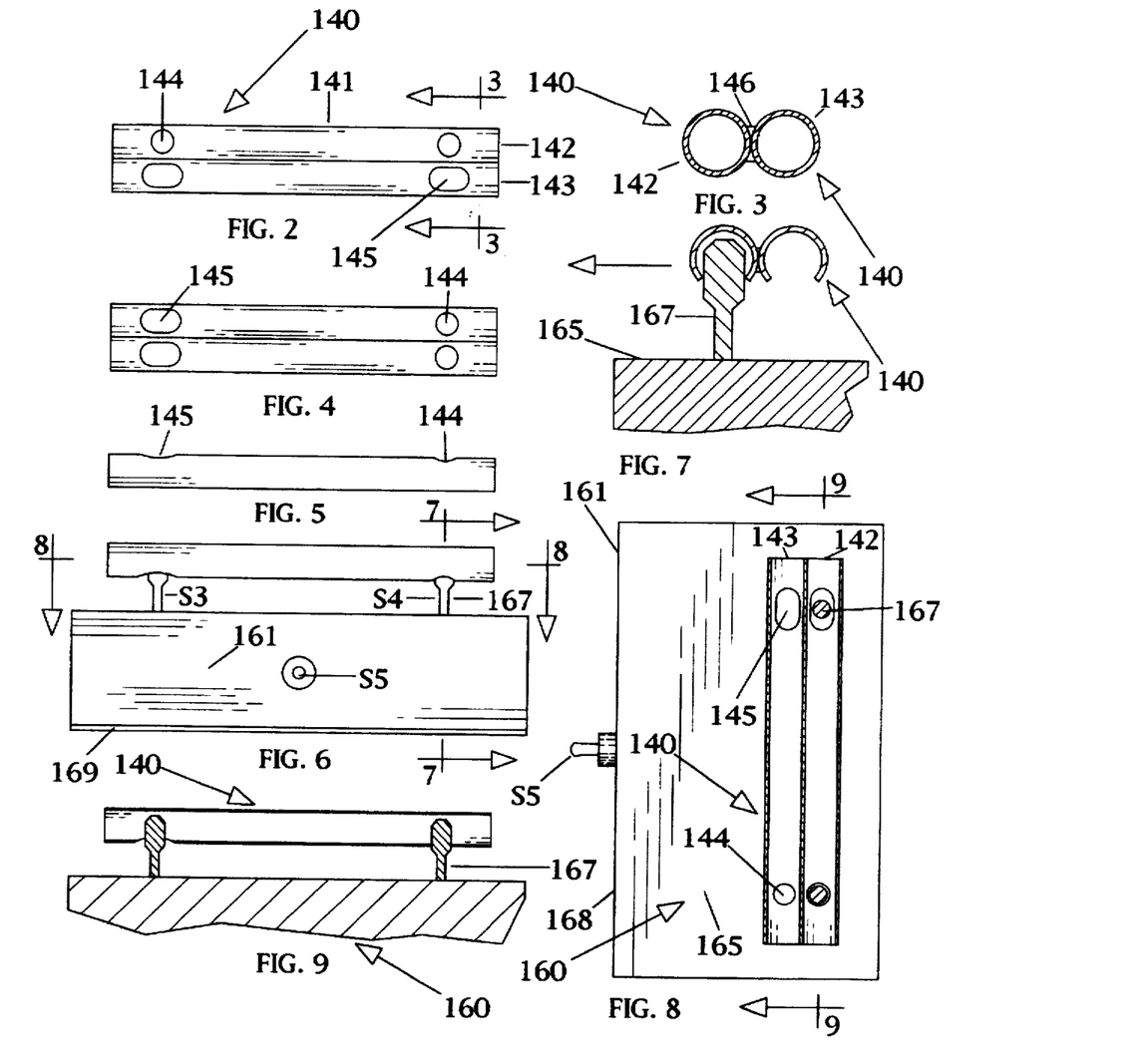
FIG. 2 is a bottom view of a first version of the directional control assembly used to mechanically link the two DPDT switches of the hand control assembly.
FIG. 3 is an cross-sectional end view of the directional control assembly of FIG. 2, along the 3—3 lines.
FIG. 4 is a bottom view of a second version of the handle assembly.
FIG. 5 is a side view of the handle assembly of FIG. 4.
FIG. 6 is rear view of the switch linkage assembly of FIG. 4 mounted on the hand control assembly, as seen from the rear of the hand control assembly.
FIG. 7 is a cross-sectional view of the hand control assembly of FIG. 6, along the 7—7 lines.
FIG. 8 is a partial cross-sectional view of the hand control assembly of FIG. 6, along the 8—8 lines.
FIG. 9 is a cross-sectional view of the hand control assembly of FIG. 8, along the 9—9 lines.

Direction controller assembly 140 provides a handle 141 which connects the switch handles 167 of switches S3, S4. The handle 141 typically takes the form of a front tube 142 and a rear tube 143, as seen in FIGS. 2–9. The tubes are joined along a lengthwise seam 146 by welding, gluing, or other means. The length and diameter of the handle 141 should be suitable for gripping by either large- or small-handed people. A pair of round holes 144 and a pair of slot holes 145 may be arranged as seen in FIG. 2, with the pair of slot holes 145 on one tube and the pair of round holes 144 on the other tube. Alternatively, the holes may be arranged as seen in FIG. 4, with the with the pair of slot holes 145 on one end of the handle assembly 141 and the pair of round holes 144 on the other end of the elongate connector. In a third alternative version of the invention (not shown) the elongate connector 141 may provide a single tube having a round hole in one end and a slot hole in the other end. Such a version is not preferred, however, since it is not adjustable for left- and right-handed users. Because the center-to-center distance between switch handles 167 varies according to the setting of the switches S3, S4, the length of the slot hole 145 should be chosen to allow for this variance.

Referring to FIG. 8, it can easily be seen that either of the direction controller 140 of either FIG. 2 or FIG. 4 may be put over the switch handles 167 of switches S3, S4 in a variety of ways, depending on the desired operating angle the user prefers. FIG. 8 shows the linkage assembly of FIG. 4 installed in a straight manner. However, by putting the unused round hole 144 over handle 167 of switch S4, the direction controller 140 would be at an angle that many right-handed users may prefer. Similarly, by putting the unused slot hole 145 over switch S3, the direction controller 140 would be at an angle that many left-handed users may prefer. (Note that for a left-handed user the flip-up arm assembly 100 supporting the hand control assembly 160 and flip-up arm assembly without a hand control assembly 160 should be swapped.)

An electrical power assembly 200 provides a 12 volt gel battery 201 to power the combined powered wheelchair and walker and in the preferred embodiment includes a 12 volt 6 amp. battery charger 206 to recharge the battery. The battery 201 is typically carried on the shelf 24, under the seat of the wheelchair in battery housing 203 having a closure mechanism 204. A circuit protector 205 typically provides a slo-blo fuse or a circuit breaker, and prevents excess current discharge in the event of a short-circuit or other malfunction. The battery charger 206 is typically not carried on the combination wheelchair and walker when in use, but may be stored, if desired, on shelf 24. The charger 206 will typically fully recharge the battery 201 overnight. Charger electrical connectors 207 and battery cable 202 connector 208 are used to attach the battery 201 and charger 206 to the circuit.

Figure 19:
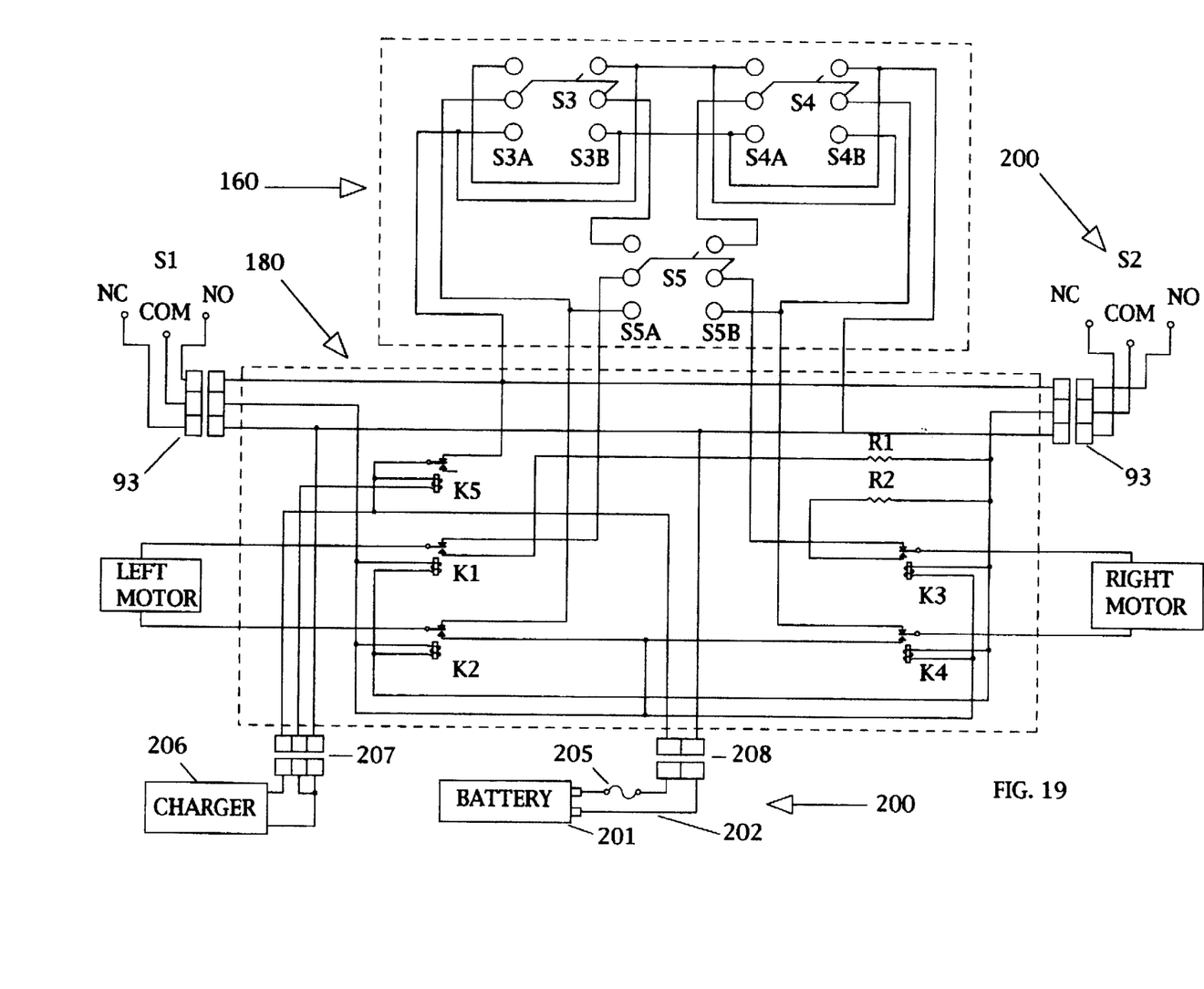
FIG. 19 is an electrical circuit schematic of a version of the invention.

Referring to FIG. 19, the electrical circuit controlling the operation of the combination powered wheelchair and walker may be understood. First, consider the scenario where the walker controls are not operated, and accordingly, relays K1, K2, K3, K4, are not energized and therefore remain with the common terminal connected to the normally closed contacts. Also, assume that the battery charger 206 is not connected, the handle assembly 141 of the directional controller 140 is in a forward position, thereby forcing both switches S3 and S4 into the forward position. Switch S3 is a center-off momentary DPDT switch that controls the left motor 223, which drives the left drive wheel 221. Similarly, switch S4 is a center-off momentary DPDT switch that controls the right motor 222. Power on-off switch S5 is a simple DPDT switch turned to the on position. When the battery charger 206 is not connected, relay K5 is in its normally closed position, allowing current to flow from the battery to switches S3 and S4. Current flows through switch S3B, through the power switch S5A, through relay K1, through the left motor, through relay K2, through switch S3A, and then back to the battery. Similarly, current flows through switch S4A, through power switch S5B, through relay K3, through the right motor, through relay K4, through switch S4B, and then back to the battery.

Next, consider the case when the battery charger 206 is not installed, the directional control assembly 140 is in a reverse position, (causing both switches S3 and S4 to be in the reverse position) and the power switch S5 is in the on position. Current flows through switch S3A, through relay K2, through the left motor, through relay K1, through power switch S5A, through switch S3B, and then back to the battery. Similarly, current flows through switch S4B, through relay K4, through the right motor, through relay K3, through power switch S5B, through switch S4A, and then back to the battery.

Clearly the direction of current flow through the motors determines the direction of the resulting drive, and is controlled by the position of switches S3 and S4. Moreover, it is easily seen by the above discussion and examination of the circuit diagram of FIG. 19 that by controlling the position of switches S3 and S4 the user may cause one motor to provide forward torque and one motor to provide reverse torque or one motor to operate and the other to be off.

Next, consider the operation of the walker controls. If the walker forward switch S2 is activated (i.e. electrical contact exists between the common and normally open leads) and walker reverse switch S1 is not activated (i.e. electrical contact exists between the common and the normally closed leads) then relays K1, K2, K3, and K4 will all be energized (i.e. electrical contact between the normally open and common leads). Current will flow from the battery through relay K5, through switch S2, after which the current will divide, some flowing through resistor R2, relay K3, the right motor, and relay K4. Current will flow through resistor R1, relay K1, the left motor, and relay K2. The current flow will then merge and flow through the common and normally closed terminals of the reverse switch S1 and then return to the battery.

As seen in FIG. 19, R1 and R2 are symbolized by a single resistor. However, in the preferred embodiment, a series of four 1.5 ohm, ten-watt resistors are actually used for each resistor R1, R2. Naturally, the exact values of these resistors can be changed to achieve the results desired with the particular drive line being used. The disclosed values work best with the preferred embodiment, and result in a slow, smooth and easy to control power walker.

Activation of the reverse walker switch S1 will result in a similar reaction, but with the current flowing through the motors in the opposite direction. Activation of both switches S1 and S2 will not activate relays K1, K2, K3, or K4, and as a result, neither motor will be activated.

Turning power on-off switch S5 off shorts the motor leads together on each side. Such action has the result of making the drive wheels more difficult to turn, and operates almost as a brake. As can be seen from examination of FIG. 19, turning power switch S5 to the off position disables switches S3 and S4, but has no effect on the operability of switches S1 and S2. However, the braking action occurs in wheelchair mode when power switch S5 is turned to the off position. Similarly, the braking action occurs in walker mode when neither the forward nor reverse switches are activated, or when both the forward and reverse switches are activated. Attaching charger 206 by means of connector 207 charges the battery 201 and also changes the state of relay K5 to prevent operation of both motors both in wheelchair or walker mode. This is called battery charger interlock and is well-known to those trained in the art.

To use the combined power wheelchair and walker the user or an attendant typically begins by disconnecting the charger electrical connector 207. If the user wants to use the walker mode first, the position of the on-off switch S5 should be inspected. Usually the off setting is preferred so that inadvertent rolling does not occur. If the user prefers more rolling action, then switch S5 may be turned on, although this will tend to be the exception and not the norm.

Grasping the handles 81, 82 of the walker handle assembly 80, the user manipulates an activation levers 84, 85, activating either the walker forward S2 or reverse switch S1. By gaining physical support from the walker handle assembly 80, the user follows the combination power wheelchair and walker until physically tired. Speed is controlled by the user applying just a few ounces of force on the handles. Since current flows through R1 and R2 only when the motors are activated by the walker switches S1 and S2, it can be understood that the left and right motors operate more slowly in walker mode. Also, when starting and stopping, the resistors R1 and R2 tend to smooth the speed of the walker, by making motor operation less abrupt. When the walking user wants to pause, the activation lever 84 or 85 is released and the chair stops rapidly. By applying more force to one handle 81, 82 than the other, the user can steer the walker very effectively with just a few ounces of force.

After physically tiring, the user will generally prefer to switch to wheelchair mode. To do this, the user releases the activation lever 84 or 85 causing the chair to stop. The user should make sure that the power on-off switch S5 is set to off, to prevent rolling while transferring into the wheelchair seat.

To sit down on the seat 21, the user first moves arm 101 to its upward position, where the up-stop 104 contacts backpost tube 121, thus clearing a large open space to the seat through which the user moves. The user then sits down and moves arm 101 downwardly, until the down-stop 103 contacts the vertical backpost tube 121, and uses the footrest assembly 60 for support of both feet.

When using the hand control assembly 160 for the first time, the user should install the handle assembly 141 of the direction controller 140 onto the switch handles 167 of switches S3, S4. Typically, a round hole 144 goes over one switch handle 167 and a slot hole 145 goes over the other switch handle. The slot hole allows the switches S3 and S4 to be set to different settings, even if the distance between the switch handles 167 varies.

The seated user then turns on power switch S5 and operates the hand control assembly 160 and direction controller 140 by pushing handle 141 forward or backward to move the wheelchair forward or backward. Twisting the handle 141 will result in the chair turning to the left or right. A slight twist to the handle 141 may result in one motor operating, while the other is powered off—resulting in a turn to either the left or right. A sharper turn of the linkage 140 may result in one motor operating in the forward direction, while the other motor operates in the reverse direction. As a result, the chair will rotate upon itself, in a revolving or spinning manner. The user continues to operate the direction controller 140 in an intuitive manner, until the destination is reached.

When done operating the combined power wheelchair and walker for the day, the user should plug in the connector 207 of the battery charger 206, so that the battery power level can be maintained at an acceptable level.

The previously described versions of the present invention have many advantages, including the advantage of providing a combination power wheelchair and walker which allows users to walk in an assisted manner when they are able, and then to ride a powered wheelchair after they become tired and are no longer able to walk.

A further advantage provided by the combined powered wheelchair and walker of the invention is the switching circuitry, which provides that the walker control assembly 80 will always operate regardless of the state of the wheelchair hand control assembly 160. This eliminates the possibility of a user getting into the walker position only to discover that the walker controls are inoperable. Similarly, since the walker controls turn off if no hands are on them, a seated user will always be able to drive the chair unless an attendant is attempting to guide or push the chair.

A further advantage provided by the combined powered wheelchair and walker of the invention is the direction controller assembly 140 which allows a user to intuitively control both the left and right switches S3, S4 of the hand control assembly 160 of the wheelchair with a simple hand or wrist movement. As a result, the expense of a joy stick and related circuitry is obviated, and the user still retains easy and intuitive control.

A further advantage provided by the combined powered wheelchair and walker of the invention is the use of resistors and flex couplings to smooth the performance of the mobility aid in an inexpensive manner.

Although the present invention has been described in considerable detail and with reference to certain preferred versions, many other embodiments are possible. For example, an outdoor version, having larger motors and frame, but still employing the principles of the invention would be possible. A variety of structures could be used to create supports consistent with the walker handle assembly 80, and would be within the spirit of the invention. Also, a variety of electrical circuits would be equivalent to the circuit shown in FIG. 19, and would follow the teachings of this invention. Similarly, the walker portion of the circuitry could be altered to allow a walker having only a forward direction, if desired. Further, the seat of the wheelchair could be removed, resulting in a power walker that is not a power wheelchair. Any of a variety of other wheelchair and/or walker controls could be added, in particular, proportional controls including a joy stick, to operate the mobility aid.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A mobility aid, suitable for assisting a person in movement, either by carrying the person or supporting the person as the person walks behind the mobility aid, comprising:

(A) a frame comprising:
   (a) seating means for supporting a seated person; and
   (b) walker handle means for providing partial support to a standing person;
(B) at least one pivoting wheel mounted on the frame;
(C) first and second independently rotatable drive wheels mounted to the frame;
(D) a first drive line assembly, mounted on the frame and mechanically connected to the first drive wheel;
(E) a second drive line assembly, mounted on the frame and mechanically connected to the second drive wheel;
(F) electrical power means for providing electrical power to the drive line assemblies;
(G) walker control means for enabling a standing user to control the operation of the first and second drive line assemblies; and
(H) hand control means for enabling a seated user to control the operation of the first and second drive line assemblies, comprising:
   (a) a handle assembly, having a first end defining a round hole and a second end defining a slot hole.

2. The mobility aid of claim 1, wherein the walker control means comprises:
   (a) first switching means, electrically connected to the first and second drive line assemblies, for controlling the operation of the first and second drive line assemblies in a first direction.

3. The mobility aid of claim 2, wherein the walker control means additionally comprises:
   (a) second switching means, electrically connected to the first and second drive line assemblies, for controlling the operation of the first and second drive line assemblies in a second direction.

4. The mobility aid of claim 1, wherein the hand control means additionally comprises:
   (a) third switching means, electrically connected to the first drive line assembly, for controlling the operation of the first drive line assembly; and
   (b) fourth switching means, electrically connected to the second drive line assembly, for controlling the operation of the second drive line assembly.

5. The mobility aid of claim 4, additionally comprising:
   (a) switching circuitry means, controlled by the walker control means, for preventing the operation of the third and fourth switching means when the walker control means is being operated.

6. The mobility aid of claim 4, wherein the hand control means additionally comprises:
   (a) fifth switching means for preventing the operation of the third and fourth switching means.

7. The mobility aid of claim 6, wherein the fifth switching means causes the electrical input and electrical output of the motors of the drive line assemblies to be shorted together.

8. The mobility aid of claim 4, additionally comprising:
   (a) directional controller means for simultaneously controlling the operation of the third and fourth switching means.

9. The mobility aid of claim 8, wherein the directional controller means additionally comprises:
   (a) a handle assembly having a first end and a second end, the handle assembly carried by the third and fourth switching means, comprising:
      (a) a round hole in the first end of the handle assembly; and
   (b) a slot hole in the second end of the handle assembly.

10. The mobility aid of claim 9, wherein the directional controller means additionally comprises:
   (a) a front tube; and
   (b) a rear tube attached to the front tube.

11. The mobility aid of claim 1, wherein the first and second drive line assemblies each comprise:
   (a) a motor having an electrical input and an electrical output, and having drive shaft output mechanically connected to a drive wheel.

12. The mobility aid of claim 11 wherein the mobility aid additionally comprises:
   (a) resistor means, connected in series with each motor, for reducing the motor's output when motor is activated by the walker control means.

13. The mobility aid of claim 11, wherein the first and second drive line assemblies additionally comprise:
   (a) a flex coupling mechanically connected to the drive shaft and to a drive wheel.

14. A mobility aid, suitable for assisting a person in movement, either by carrying the person or supporting the person as the person walks behind the mobility aid, comprising:
   (a) a frame, comprising:
      (a) seating means for supporting a seated person; and
      (b) walker handle means for providing partial support to a standing person;
   (b) at least one pivoting wheel mounted on the frame;
   (c) first and second independently rotatable drive wheels mounted to the frame;
   (d) a first drive line assembly, mounted on the frame and mechanically connected to the first drive wheel and a second drive line assembly, mounted on the frame and mechanically connected to the second drive wheel, each drive line assembly comprising:
      (a) a motor having an electrical input and an electrical output, and having a drive shaft output; and
      (b) a flex coupling attached to the drive shaft and to a drive wheel;
   (e) electrical power means for providing electrical power to the drive line assemblies;
   (f) walker control means for enabling a standing user to control the operation of the first and second drive line assemblies, comprising
      (a) first switching means, electrically connected to the first and second drive line assemblies, for controlling the operation of the first and second drive line assemblies in a first direction; and
      (b) second switching means, electrically connected to the first and second drive line assemblies, for controlling the operation of the first and second drive line assemblies in a second direction;
   (g) hand control means for enabling a seated user to control the operation of the first and second drive line assemblies, comprising:
      (a) third switching means, electrically connected to the first drive line assembly, for controlling the operation of the first drive line assembly in the first and second direction;
      (b) fourth switching means, electrically connected to the second drive line assembly, for controlling the operation of the second drive line assembly in the first and second direction; and (c) fifth switching means, operable by a user, for preventing the operation of the third and fourth switching means and for causing the electrical input and electrical output of the motors of the drive line assemblies to be shorted together when the first and second switching means are not activated; and (h) switching circuitry means, controlled by the walker control assembly, for preventing the operation of the third, fourth and fifth switching means when the walker control assembly is being operated.

15. The mobility aid of claim 14, wherein the mobility aid additionally comprises:

(a) resistor means, connected in series with each motor, for reducing the motor's output when motor is activated by the walker control means.

16. The mobility aid of claim 14, additionally comprising:

(a) directional controller means for simultaneously controlling the operation of the third and fourth switching means.

17. The mobility aid of claim 16, wherein the directional controller means additionally comprises:

(a) a handle assembly having a first end and a second end, the handle assembly carried by the third and fourth switching means, comprising:

(a) a round hole in the first end of the handle assembly; and (b) a slot hole in the second end of the handle assembly.

18. The mobility aid of claim 17, wherein the directional controller means additionally comprises:

(a) a front tube; and (b) a rear tube attached to the front tube.

* * * * *